United States Patent
Watanabe et al.

(10) Patent No.: US 9,876,217 B2
(45) Date of Patent: Jan. 23, 2018

(54) BATTERY ELECTRODE MANUFACTURING APPARATUS AND METHOD THEREOF

(75) Inventors: Masashi Watanabe, Atsugi (JP);
Hiroshi Yuhara, Yokohama (JP);
Manabu Yamashita, Kyoto (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 1059 days.

(21) Appl. No.: 14/009,673

(22) PCT Filed: Apr. 6, 2012

(86) PCT No.: PCT/JP2012/059464
§ 371 (c)(1),
(2), (4) Date: Oct. 3, 2013

(87) PCT Pub. No.: WO2012/137900
PCT Pub. Date: Oct. 11, 2012

(65) Prior Publication Data
US 2014/0020240 A1    Jan. 23, 2014

(30) Foreign Application Priority Data

Apr. 7, 2011 (JP) .................. 2011-085724
Apr. 7, 2011 (JP) .................. 2011-085727
(Continued)

(51) Int. Cl.
*H01M 4/04* (2006.01)
*H01M 4/139* (2010.01)
*H01M 10/04* (2006.01)

(52) U.S. Cl.
CPC ........... *H01M 4/04* (2013.01); *H01M 4/0404* (2013.01); *H01M 4/139* (2013.01);
(Continued)

(58) Field of Classification Search
CPC ... H01M 10/0404; B26D 7/018; B65H 20/12; B65H 20/16; B65H 20/18
See application file for complete search history.

(56) References Cited

U.S. PATENT DOCUMENTS 3,887,082 A    6/1975  Posselt
4,587,873 A *  5/1986  Gerber .................... B08B 15/00
                                                        269/21

(Continued)

FOREIGN PATENT DOCUMENTS

JP    48-99856 A    12/1973
JP    61-71618 A    4/1986
(Continued)

*Primary Examiner* — Stephan Essex
(74) *Attorney, Agent, or Firm* — Foley & Lardner LLP

(57) ABSTRACT

A battery electrode manufacturing apparatus including: a front end die which cuts a strip-shaped electrode material into an electrode shape; a hand which grasps the electrode material and conveys the electrode material to the cutting position of the front end die; and a first suction conveyor which is disposed upstream of the front end die in a conveying direction and has a supporting surface for supporting the electrode material during the cutting by the front end die. The hand includes a first grasper and a second grasper, and the first suction conveyor is disposed between the first grasper and the second grasper. The hand carries the electrode material to the cutting position, at such a position that the electrode material does not contact the front end die and the first suction conveyor.

29 Claims, 9 Drawing Sheets

(30) Foreign Application Priority Data

Apr. 7, 2011 (JP) .................................. 2011-085729
Mar. 23, 2012 (JP) .................................. 2012-067798

(52) U.S. Cl.
CPC .... *H01M 10/0404* (2013.01); *H01M 10/0413* (2013.01); *Y10T 29/49108* (2015.01); *Y10T 29/53135* (2015.01)

(56) References Cited

U.S. PATENT DOCUMENTS

| | | | |
|---|---|---|---|
| 4,740,668 | A | 4/1988 | Perez |
| 7,398,593 | B2 | 7/2008 | Nitoh et al. |
| 7,617,595 | B2 | 11/2009 | Nitoh et al. |
| 8,105,395 | B2 | 1/2012 | Teramoto |
| 8,313,606 | B2 | 11/2012 | Nagare et al. |
| 2003/0156376 | A1 | 8/2003 | Nitoh et al. |
| 2008/0216308 | A1 | 9/2008 | Nitoh et al. |
| 2009/0038144 | A1 | 2/2009 | Teramoto |
| 2010/0212817 | A1 | 8/2010 | Nagare et al. |
| 2012/0318462 | A1 | 12/2012 | Nagare et al. |

FOREIGN PATENT DOCUMENTS

| | | |
|---|---|---|
| JP | 61-293669 A | 12/1986 |
| JP | 05-072845 U | 10/1993 |
| JP | 08-040598 A | 2/1996 |
| JP | 9-219189 A | 8/1997 |
| JP | 09-280551 A | 11/1997 |
| JP | 09-320567 A | 12/1997 |
| JP | 11-265703 A | 9/1999 |
| JP | 2001-332247 A | 11/2001 |
| JP | 2002-037501 A | 2/2002 |
| JP | 2002-203756 A | 7/2002 |
| JP | 2002-225157 A | 8/2002 |
| JP | 2003-025136 A | 1/2003 |
| JP | 2003-45498 A | 2/2003 |
| JP | 2004-091067 A | 3/2004 |
| JP | 2004-103485 A | 4/2004 |
| JP | 2004-307122 A | 11/2004 |
| JP | 2006-069735 A | 3/2006 |
| JP | 2006-346778 A | 12/2006 |
| JP | 2007-128841 A | 5/2007 |
| JP | 2010-067507 A | 3/2010 |
| JP | 2010-198770 A | 9/2010 |
| WO | WO 2009/019781 A1 | 2/2009 |

* cited by examiner

BATTERY ELECTRODE MANUFACTURING APPARATUS AND METHOD THEREOF

TECHNICAL FIELD

The present invention relates to a battery electrode manufacturing apparatus and a method thereof and relates more specifically to a battery electrode manufacturing apparatus and a method thereof which involve conveying and cutting an electrode material of a strip foil shape into a predetermined size to manufacture a battery electrode.

BACKGROUND ART

Positive electrodes and negative electrodes (these will be referred collectively as electrodes) used in batteries have a structure in which a very thin metal foil is coated with an active material on both sides. Electrodes are manufactured by cutting a strip-shaped electrode material, which is a metal foil with an active material formed on both sides, into a predetermined size (see Patent Literature 1, for example).

CITATION LIST

Patent Literature

Patent Literature 1: Japanese Patent Application Publication No. 2007-128841

SUMMARY OF INVENTION

Technical Problem

Meanwhile, in the technique of Patent Literature 1 mentioned above, the strip-shaped electrode material is fed into a die while being chucked at a position away from its leading end portion. Thus, the leading end portion of the strip-shaped electrode material is inserted into the die and becomes supported on a bottom die of the die by being pushed from the rear. This has been causing the problem of the strip-shaped electrode material rubbing against the bottom die as the strip-shaped electrode material is fed for cutting the next electrode.

An object of the present invention is to provide a battery electrode manufacturing apparatus and a method thereof which can convey an electrode material of a strip foil shape to a cutting position without rubbing it against other members.

Solution to Problem

A first aspect of the present invention provides a battery electrode manufacturing apparatus, including: a cutting device which cuts an electrode material of a strip foil shape into an electrode shape; a carrying-in device which grasps the electrode material and conveys the electrode material to a cutting position of the cutting device; and a supporting device which is disposed upstream of the cutting device in a conveying direction of the electrode material and has a supporting surface for supporting the electrode material when the cutting device cuts the electrode material. The carrying-in device includes a pair of graspers, and the supporting device is located between the pair of graspers. The carrying-in device carries the electrode material to the cutting position, at such a position that the electrode material does not contact the cutting device and the supporting device.

A second aspect of the present invention is a battery electrode manufacturing method using the above battery electrode manufacturing apparatus. This method includes: holding and carrying the electrode material to the cutting position by means of the carrying-in device, the electrode material being held at such a position as not to contact the cutting device and the supporting device; and cutting the carried electrode material into the electrode shape by means of the cutting device while supporting the electrode material on the supporting surface.

DESCRIPTION OF EMBODIMENTS

Figure 1:
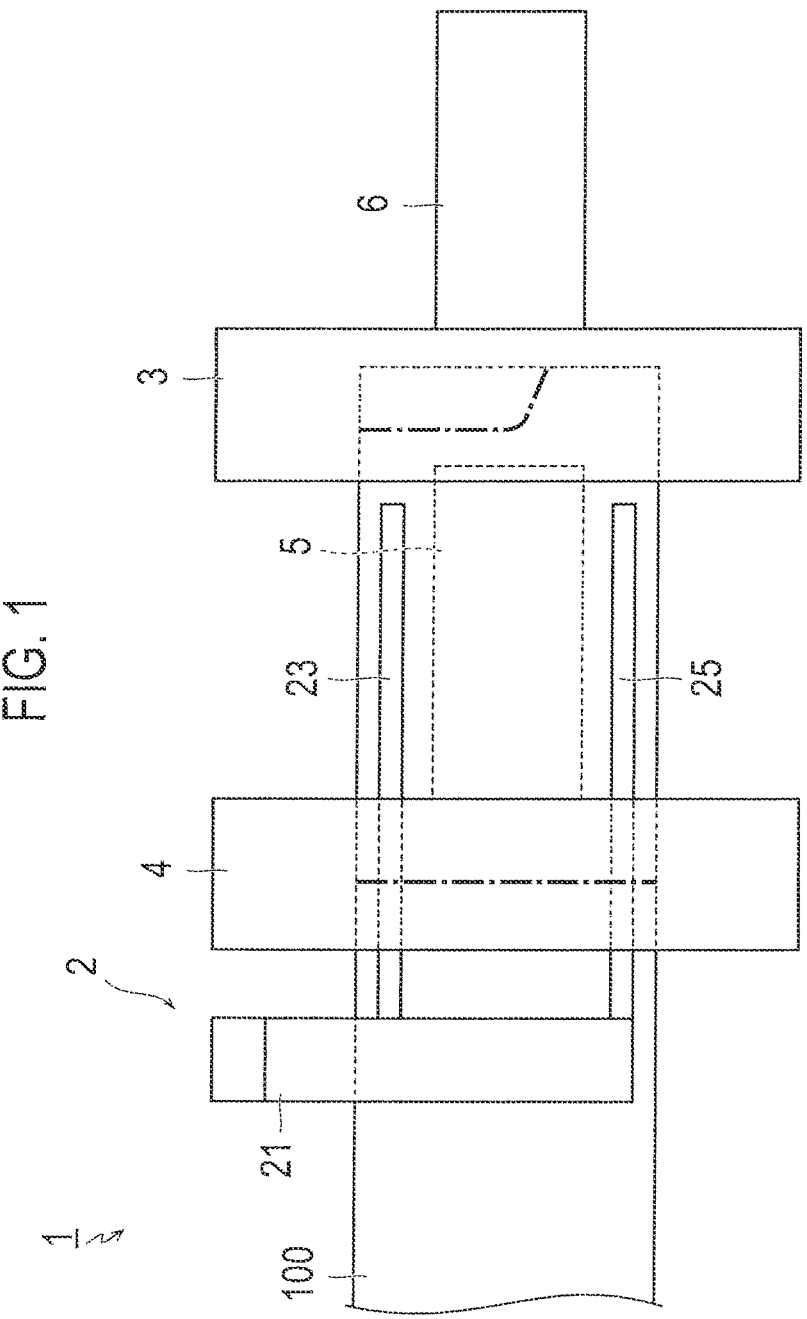
FIG. 1 is a schematic plan view showing the configuration of an electrode manufacturing apparatus.

Hereinbelow, an embodiment of the present invention will be described with reference to the accompanying drawings. Note that in the description of the drawings, the same element will be denoted by the same reference sign, and overlapping description will be omitted. Moreover, the size and ratio of each member in the drawings are exaggerated for explanatory purposes and differ from the actual size and ratio.

Figure 2:
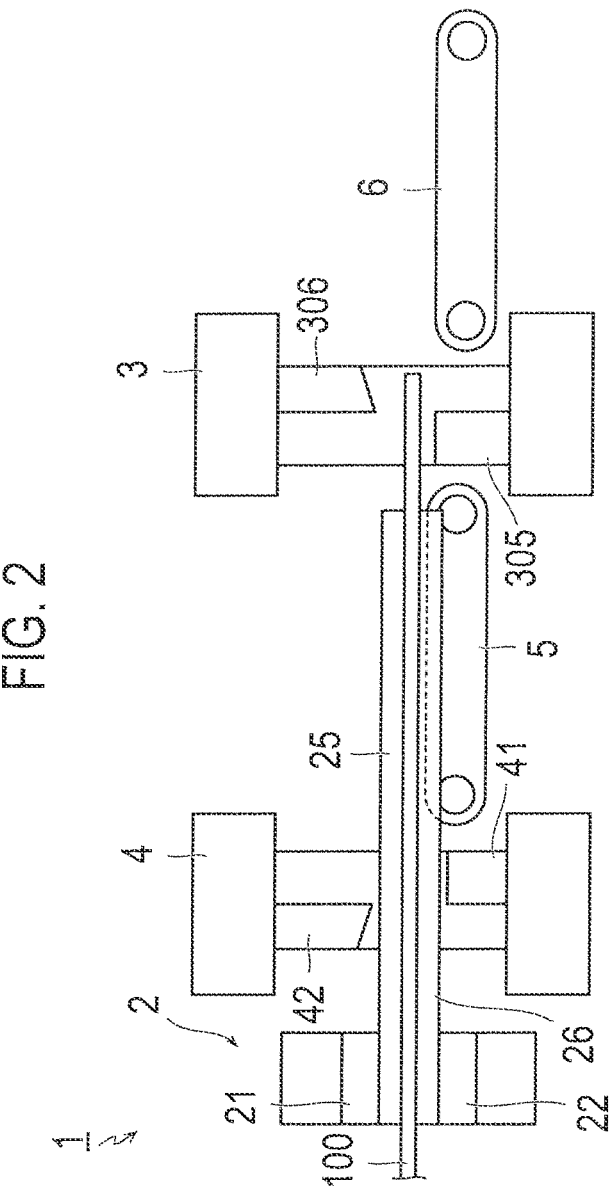
FIG. 2 is a schematic side view showing the configuration of the electrode manufacturing apparatus.

FIG. 1 is a schematic plan view showing the configuration of an electrode manufacturing apparatus. FIG. 2 is a schematic side view showing the configuration of the electrode manufacturing apparatus.

First, an outline of the electrode manufacturing apparatus will be described.

An electrode manufacturing apparatus 1 includes a hand 2, a front end cutting die (hereinafter, referred to as the front end die 3), a rear end cutting die (hereinafter, referred to as the rear end die 4), a first suction conveyor 5, and a second suction conveyor 6.

The hand 2 serves as a carrying-in device and includes graspers (described later) which clamp an electrode material of a strip foil shape (hereinafter, referred to as the strip-shaped electrode material 100). The hand 2 uses the graspers to clamp the strip-shaped electrode material 100 and convey it into the front end die 3 through the air. The front end die 3 is a cutting device and cuts the front end of the strip-shaped electrode material 100. The hand 2 positions the strip-shaped electrode material 100 such that a leading end portion of the strip-shaped electrode material 100 is located at a predetermined position inside the front end die 3. The predetermined position refers to a position at which the front end die 3 cuts the front end of the strip-shaped electrode material 100 (hereinafter, the cutting position). The rear end die 4 is a rear end cutting device and cuts the strip-shaped electrode material 100 at a portion corresponding to the rear end of an electrode. The first suction conveyor 5 is a supporting device and installed upstream of the front end die 3 in the direction in which the strip-shaped electrode material 100 is conveyed (hereinafter, the conveying direction). The conveying surface of the first suction conveyor 5 serves as a supporting surface which, at the time of cutting the strip-shaped electrode material 100, supports the strip-shaped electrode material 100 and attracts and holds the positioned strip-shaped electrode material 100. After the cutting of the rear end of the strip-shaped electrode material 100, the first suction conveyor 5 is used also to discharge the cut electrode toward the downstream side of the front end die 3 in the conveying direction. After the cutting of the rear end of the strip-shaped electrode material 100, the second suction conveyor 6 receives the electrode sent out by the first suction conveyor 5 and discharges is further toward the downstream side in the conveying direction. Note that the dashed lines in FIG. 1 indicate the cutting profiles. Moreover, the rear end refers to a portion corresponding to the rear end of the electrode obtained by the cutting.

Now, each part of the electrode manufacturing apparatus 1 will be described in detail.

Figure 3:
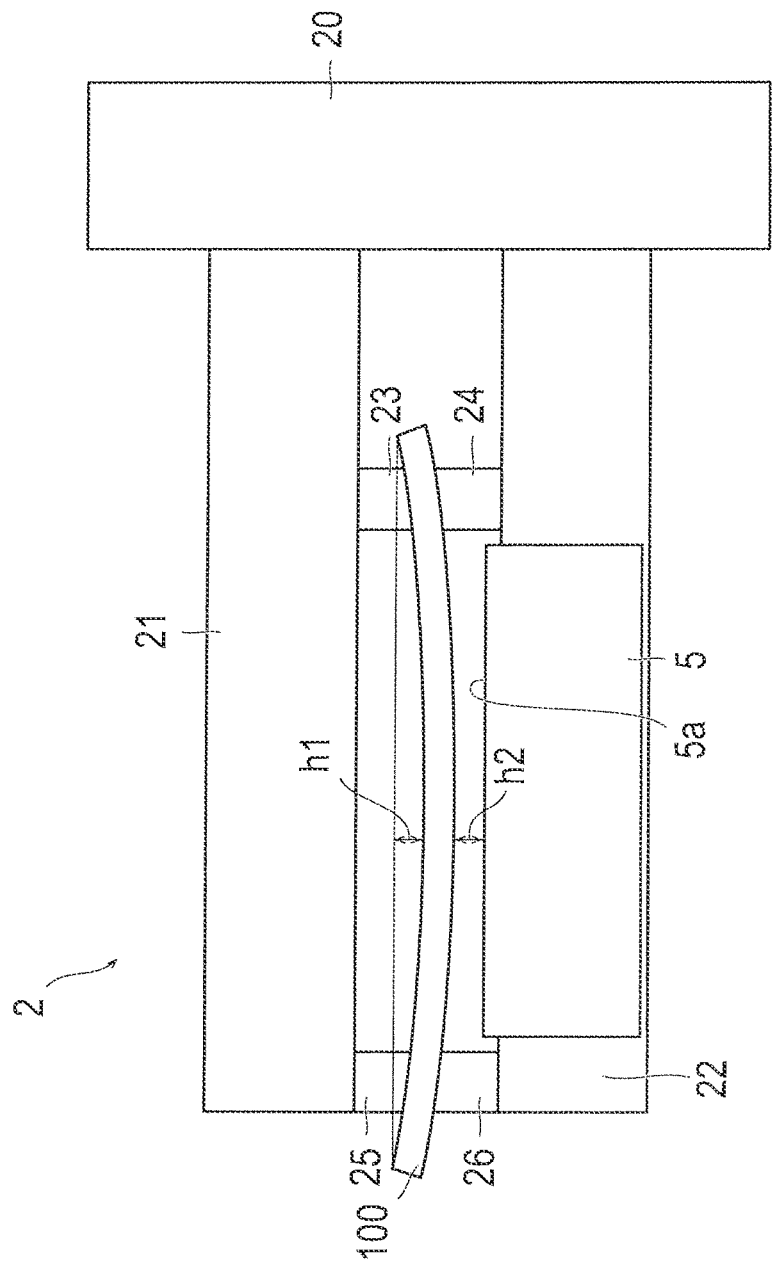
FIG. 3 is an elevational view showing details of a hand.

FIG. 3 is an elevational view showing details of the hand 2 and is a view of the hand 2 and the first suction conveyor 5 as seen in a direction from the front end die 3 toward the rear end die 4 (as seen from the downstream side toward the upstream side). Note that illustration of members other than the hand 2 and the first suction conveyor 5 is omitted.

When carrying the strip-shaped electrode material 100 to the cutting position, the hand 2 conveys the strip-shaped electrode material 100 through the air while holding it at such a position that each part constituting the hand 2 and the first suction conveyor 5 do not interfere with each other (details described later). Moreover, the hand 2 grasps the strip-shaped electrode material 100 by touching it at such a position that each part constituting the hand 2 does not reach the front end die 3 (i.e. does not interfere with the die) when the strip-shaped electrode material 100 is conveyed to the front end die 3.

Moreover, when carrying the strip-shaped electrode material 100 to the cutting position for cutting with the front end die 3 and the rear end die 4, the hand 2 positions the strip-shaped electrode material 100 to the cutting position at the same time.

The hand 2 includes main arms 21 and 22, grasping members 23 to 26 which are connected to the main arms 21 and 22, and a grasping mechanism part 20 which vertically moves each of the whole main arms 21 and 22 and performs grasping operations with the grasping members 23 to 26.

The grasping members 23 and 25 are attached to the main arm 21, and the grasping members 24 and 26 are attached to the main arm 22. The grasping member 23 is provided to face the grasping member 24, and the grasping member 25 is provided to face the grasping member 26. The grasping member 23 and the grasping member 24 grasp (hold) one end (left end) of the strip-shaped electrode material 100 therebetween. Similarly, the grasping member 25 and the grasping member 26 grasp (hold) the other end (right end) of the strip-shaped electrode material 100 therebetween. The positions of the grasp are on a rear side in the conveying direction (an upstream side in the conveying direction or a side away from the leading end portion of the strip-shaped electrode material 100), and are such positions that the grasping members 23 to 26 do not interfere with the front end die 3 when grasping and conveying the strip-shaped electrode material 100 to the cutting position. Moreover, the grasping positions only need to be such positions that the strip-shaped electrode material 100 can be grasped at its side ends to be curved (details described later).

The grasping members 23 and 24 serve as a first grasper, and the grasping members 25 and 26 serves as a second grasper, and the first grasper (grasping members 23 and 24) and the second grasper (grasping members 25 and 26) constitute a pair of graspers.

The grasping members 23 to 26 are attached to the main arms 21 and 22 in such a way as to extend in parallel with the conveying direction of the strip-shaped electrode material 100. The attached positions of the grasping members 23 to 26 are such positions that the first suction conveyor 5 being a supporting device is disposed between the pair of graspers (i.e. the first grasper (grasping members 23 and 24) and the second grasper (grasping members 25 and 26)). In this way, the pair of graspers (the first grasper (grasping members 23 and 24) and the second grasper (grasping members 25 and 26)) can perform a conveying operation by passing by the left and right sides of the first suction conveyor 5 without interfering with the first suction conveyor 5.

Note that each one of the grasping members 23 to 26 may be called a finger of a robotic hand.

The whole main arms 21 and 22 advance and retreat along the conveying direction along with the grasping mechanism part 20. In this action, the grasping members 23 to 26 pass by the laterally outer sides of the first suction conveyor 5 since the first suction conveyor 5 is disposed between the pair of graspers (the first, grasper (grasping members 23 and 24) and the second grasper (grasping members 25 and 26)). Thus, with a slightly raising operation (raising the strip-shaped electrode material 100 by a slight amount of raise), the hand 2 can suspend the strip-shaped electrode material 100 over the first suction conveyor 5 and convey it.

Meanwhile, assume a case where each part of the hand is disposed in such a way as to pass immediately above the first suction conveyor. In the case of the assumed configuration, the hand would hit (interfere with) the first suction conveyor if the hand were simply moved horizontally when grasping and carrying a strip-shaped electrode material into the die. Thus, when grasping a strip-shaped electrode material, the hand must grasp it at the rear (upstream in the conveying direction) of the first suction conveyor. Thereafter, the hand must be raised to a large extent until it becomes located higher than the first suction conveyor so that the hand can pass above the first suction conveyor. Moreover, the hand must of course be lowered to a large extent when returning to the initial grasping position. Thus, in the case of the assumed configuration, the distance of vertical movement of the hand is long and increases the operation time accordingly. In contrast, the configuration of this embodiment involves only slight vertical movement (or no vertical movement) of the hand 2, so that the time taken for the vertical movement can be shortened significantly.

The grasping mechanism part 20 is a mechanism for vertically moving each of the whole arms 21 and 22, as well as for grasping (holding from both sides) and releasing the strip-shaped electrode material 100 by means of the grasping members 23 to 26. The grasping mechanism part 20 only needs to be one for performing normal hand operations.

As shown in FIG. 3, the surfaces of the grasping members 23 to 26 to be in contact with the strip-shaped electrode material 100 are obliquely inclined so as to curve the strip-shaped electrode material 100 in a direction crossing the conveying direction when grasping the strip-shaped electrode material 100. By curving the strip-shaped electrode material 100, the rigidity of the strip-shaped electrode material 100 in the conveying direction is enhanced, so that a front end portion not grasped by the grasping members 23 to 26 is prevented from hanging down, for example.

Figure 4:
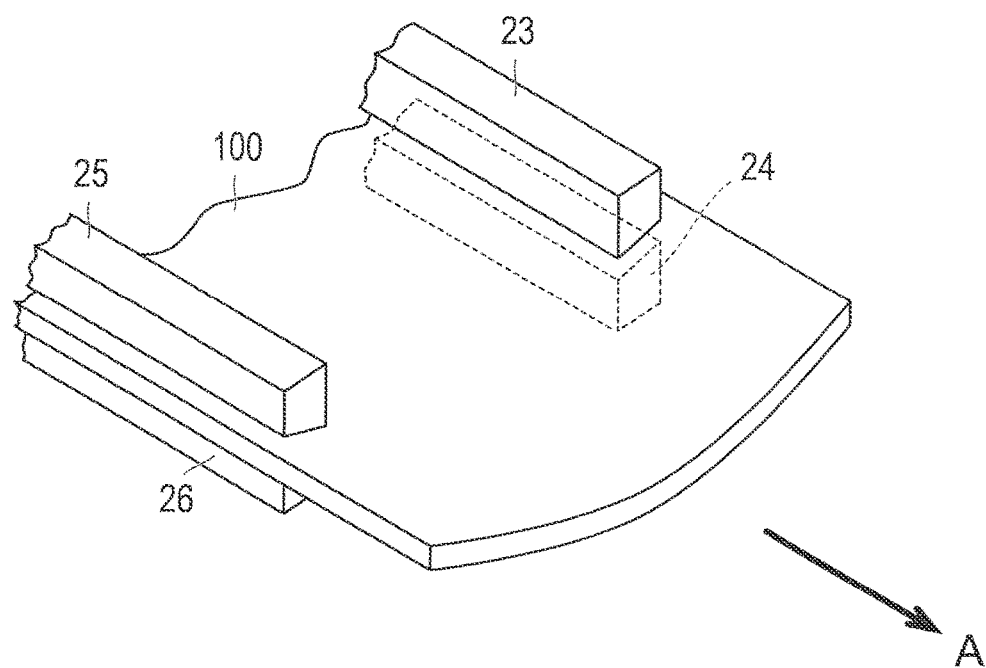
FIG. 4 is a perspective view showing a curved shape of a strip-shaped electrode material.

FIG. 4 is a perspective view showing a curved shape of the strip-shaped electrode material. In the drawing, the direction indicated by arrow A is the conveying direction (the same applies to FIG. 5).

As shown in FIG. 4, when clamping the strip-shaped electrode material 100, the grasping members 23 to 26 of the hand 2 curve the strip-shaped electrode material 100 into such a state that its center portion sags (bulges downward).

With the strip-shaped electrode material center portion sagging as described above, the rigidity of the strip-shaped electrode material 100 in the conveying direction is enhanced, so that the front end portion not grasped by the grasping members 23 to 26 is prevented from hanging down.

Such a curved shape with a sagging center portion can be created by simply grasping and lifting up both side portions of the strip-shaped electrode material 100. In this case, once the hand 2 grasps both side portions of the strip-shaped electrode material 100, the hand 2 is raised slightly to such an extent that the center portion of the strip-shaped electrode material 100 does not touch the conveying surface of the first suction conveyor 5 below it. The amount of raise of the hand 2 is preferably such that the center portion of the strip-shaped electrode material 100 does not touch the first suction conveyor 5 but is located as close as possible to the first suction conveyor 5. Specifically, the upper limit for the amount of raise of the hand 2 is a position at and below which the strip-shaped electrode material 100 does not touch a top die 306 of the front end die 3 when the strip-shaped electrode material 100 is carried between the top die 306 and a bottom die 305 of the front end die 3. Nonetheless, the amount of raise of the hand 2 is preferably as small as possible because a large amount of raise increases the time taken for the vertical movement of the hand 2 accordingly and therefore increases the takt time. Moreover, since the front end of the strip-shaped electrode material 100 needs to be inserted between the top die 306 and the bottom die 305 of the front end die 3, a large space must be secured between the top die 306 and the bottom die 305 of the front end die 3 if the amount of raise of the hand 2 is large. This is not preferable because the large space increases the amount of die operation and therefore increases the takt time. Thus, the amount of raise of the hand 2 is preferably as small as possible, also in view of the die configuration as described above.

In view of the above points, the hand 2 is vertically moved with the conveying surface of the first suction conveyor 5 being always located between the grasping members 23 and 24 (first grasper) and the grasping members 25 and 26 (second grasper) constituting the hand 2. Thus, the amount of raise of the hand 2 can be made smaller.

More specifically, in the case where the strip-shaped electrode material 100 is set to a state of sagging in the center portion, for example, the amount of curve to be described below is set substantially equal to the gap (h2 in FIG. 3) between the lower surface of the center portion and a conveying surface (supporting surface) 5a. In this way, the amount of movement of the hand 2 is small. Here, the amount of curve refers to the difference (h1 in FIG. 3) between the level of the lowest point on the upper surface of the center portion and the level of either end of the upper surface in a direction perpendicular to the conveying direction. For example, in the case where the amount of curve h1 of the strip-shaped electrode material 100 is set to about 0.5 to 2 mm, the amount of raise of the hand 2 is set correspondingly to about 0.5 to 2 mm. Thus, the hand 2 is vertically moved only by a slight amount, and the strip-shaped electrode material 100 is also prevented from rubbing against the conveying surface 5a of the first suction conveyor 5.

The gap h2 between the lower surface of the center portion and the conveying surface 5a is not limited to the above example as a matter of course as long as it is a level that prevents the strip-shaped electrode material 100 from rubbing against the conveying surface 5a of the first suction conveyor 5.

Only a slight amount of curve is needed because the curve of the strip-shaped electrode material 100 needs to impart rigidity to the strip-shaped electrode material 100 only to such an extent as to prevent its front end from hanging down. Specifically, sufficient rigidity can be imparted to the strip-shaped electrode material 100 only by curving the strip-shaped electrode material 100 such that the difference (h1 in FIG. 3) between the level of the lowest point on the upper surface of the center portion and the level of either end of the upper surface in the direction perpendicular to the conveying direction is about 0.5 to 2 mm, although this varies depending upon the size and thickness of the strip-shaped electrode material 100. The amount of curve (the amount of sag of the center portion from either end) is not particularly limited as a matter of course as long as it is an amount that can impart rigidity to the strip-shaped electrode material 100 to such an extent as to prevent the front end of the strip-shaped electrode material 100 from hanging down when its rear end side is grasped. The amount of curve may be changed according to the size and thickness of the strip-shaped electrode material 100, for example, by setting a large amount of curve for a large and thick strip-shaped electrode material 100, setting a small amount of curve for a thin strip-shaped electrode material 100, and so on.

Figure 5:
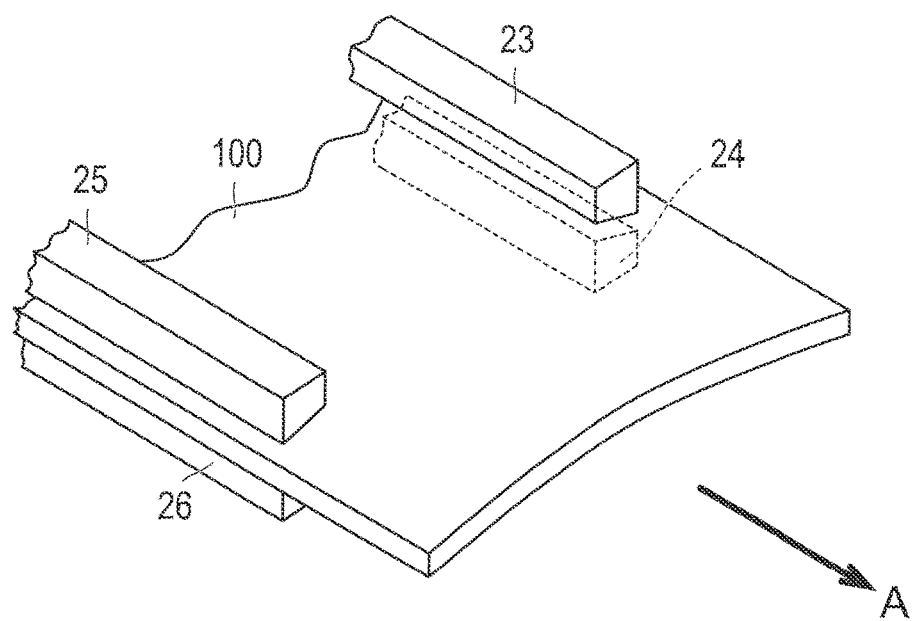
FIG. 5 is a perspective view showing another curved shape of the strip-shaped electrode material.

FIG. 5 is a perspective view showing another curve shape of the strip-shaped electrode material.

As shown in FIG. 5, when clamping the strip-shaped electrode material 100, the grasping members 23 to 26 of the hand 2 may curve the strip-shaped electrode material 100 into such a state that the center portion of the strip-shaped electrode material 100 rises. In this case, the inclinations of the surfaces of the grasping members 23 to 26 to be in contact with the strip-shaped electrode material 100 should be the reverse of those shown in FIG. 3. With the strip-shaped electrode material 100 being set in the state of rising in the center portion as described above, the strip-shaped electrode material 100 can be conveyed without changing the vertical position of the hand 2 during the carrying operation. That is, vertical movement of the hand 2 is not necessary. The grasping members 23 to 26 can curve the strip-shaped electrode material 100 to make its center portion bulge upward by simply grasping the vicinity of either side end of the strip-shaped electrode material 100. In this case, the positions (levels) at which the grasping members 23 to 26 grasp the strip-shaped electrode material 100 may be on the same plane as the conveying surface of the first suction conveyor 5. By simply being grasped by the grasping members 23 to 26, the strip-shaped electrode material 100 is curved upward and its whole part is set above the conveying surface of the first suction conveyor 5. As a result, the strip-shaped electrode material 100 is prevented from contacting the first suction conveyor 5, thereby eliminating the need for vertical movement of the hand 2.

In the above case, since vertical movement of the hand 2 is not practically necessary, the conveying surface of the first suction conveyor 5 is always located between the grasping members 23 and 24 (first grasper) and the grasping members 25 and 26 (second grasper). That is, the conveying surface of the first suction conveyor 5 is always located within the range of the dimension of the first and second graspers in the height direction.

Meanwhile, the amount of curve in the above case (the amount of rise of the center portion from either end) is not particularly limited as well and may be the same as that in the aforementioned case where the strip-shaped electrode material 100 is curved downward. That is, the amount of curve may be an amount that can impart rigidity to the strip-shaped electrode material 100 to such an extent as to prevent the front end of the strip-shaped electrode material 100 from hanging down when its rear end side is grasped, and that prevents the strip-shaped electrode material 100 from contacting (interfering with) the first suction conveyor 5 as well. The amount of curve may be changed according to the size and thickness of the strip-shaped electrode material 100, for example, by setting a large amount of curve for a large and thick strip-shaped electrode material 100, setting a small amount of curve for a thin strip-shaped electrode material 100, and so on.

Now, the direction in which to give the curvature when curving the strip-shaped electrode material 100 will further be described. FIGS. 4 and 5 have shown an example where the strip-shaped electrode material 100 is curved to bulge downward (FIG. 4) and an example where the strip-shaped electrode material 100 is curved to bulge upward (FIG. 5). In either case, the direction in which the curvature is given is a direction perpendicular to the conveying direction. The above shapes are obtained because grasping the side portions of the strip-shaped electrode material 100 with the grasping members 23 to 26 of the hand 2 curves the strip-shaped electrode material 100.

In order to prevent the front end of the strip-shaped electrode material 100 from hanging down, required is simply enhancing the rigidity thereof in the conveying direction. Hence, the direction in which to give the curvature may be any direction as long as the direction crosses the conveying direction.

Next, the front end die 3 is a die for cutting the strip-shaped electrode material 100 into an electrode shape together with the rear end die 4.

Figure 6:
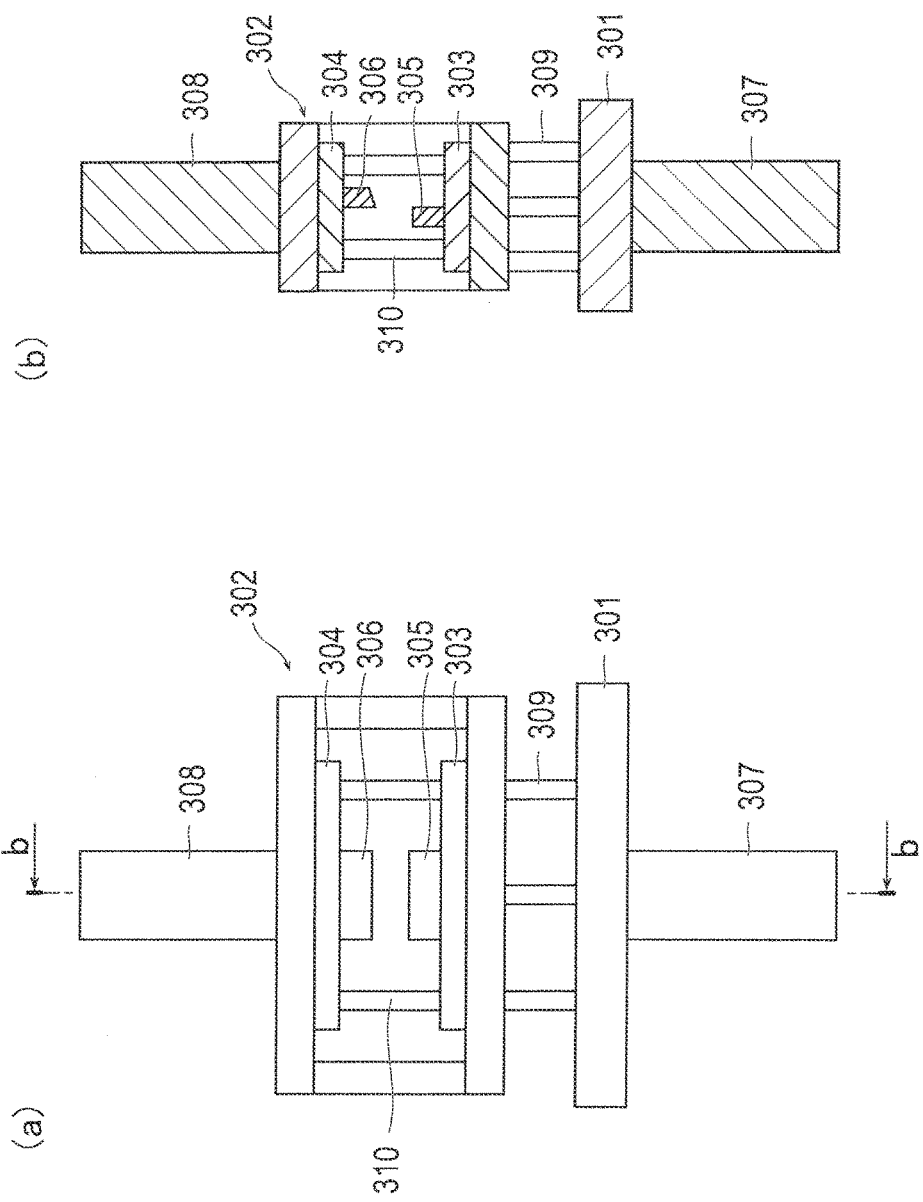
FIG. 6 is a set of views showing a front end die. Part (a) is an elevational view of only the front end die as seen from a downstream side in a conveying direction. Part (b) is a cross-sectional view taken along line b in Part (a).

FIG. 6 is a set of views showing the front end die 3. Part (a) is an elevational view of only the front end die 3 as seen from the downstream side in the conveying direction. Part (b) is a cross-sectional view taken along line b in Part (a).

The front end die 3 includes a die supporting table 301, a die frame 302, a bottom die base 303, a top die base 304, the bottom die 305, the top die 306, a frame cylinder 307 (raising-lowering device), a top die cylinder 308, frame guides 309, and top die guides 310.

The frame cylinder 307 is attached to the die supporting table 301. The frame guides 309 are provided on top of the die supporting table 301. The frame cylinder 307 and the frame guides 309 support the die frame 302. The frame cylinder 307 drives the die frame 302, and the die frame 302 moves vertically along the frame guides 309. There are provided four frame guides 309.

The bottom die base 303 is fixed to an inner lower portion of the die frame 302, and the bottom die 305 is fixed to this bottom die base 303. On the other hand, the top die base 304 is provided on an inner upper portion of the die frame 302, and the top die 306 is fixed to this top die base 304. The top die guides 310 are fixed inside the die frame 302, the top die guides 310 extending from a lower portion to an upper portion of the die frame 302. The top die base 304 is vertically movable along the top die guides 310 and vertically moves inside the die frame 302 when driven by the top die cylinder 308. This structure in which the top die 306 and the bottom die 305 are provided integrally inside the die frame 302 maintains prescribed positions of the top die 306 and the bottom die 305 at which they engage with each other. There are provided four top die guides 310.

Then, as the top die base 304 lowers inside the die frame 302, the top die 306 fixed to the top die base 304 engages with the bottom die 305 and cuts the strip-shaped electrode material 100.

Figure 7:
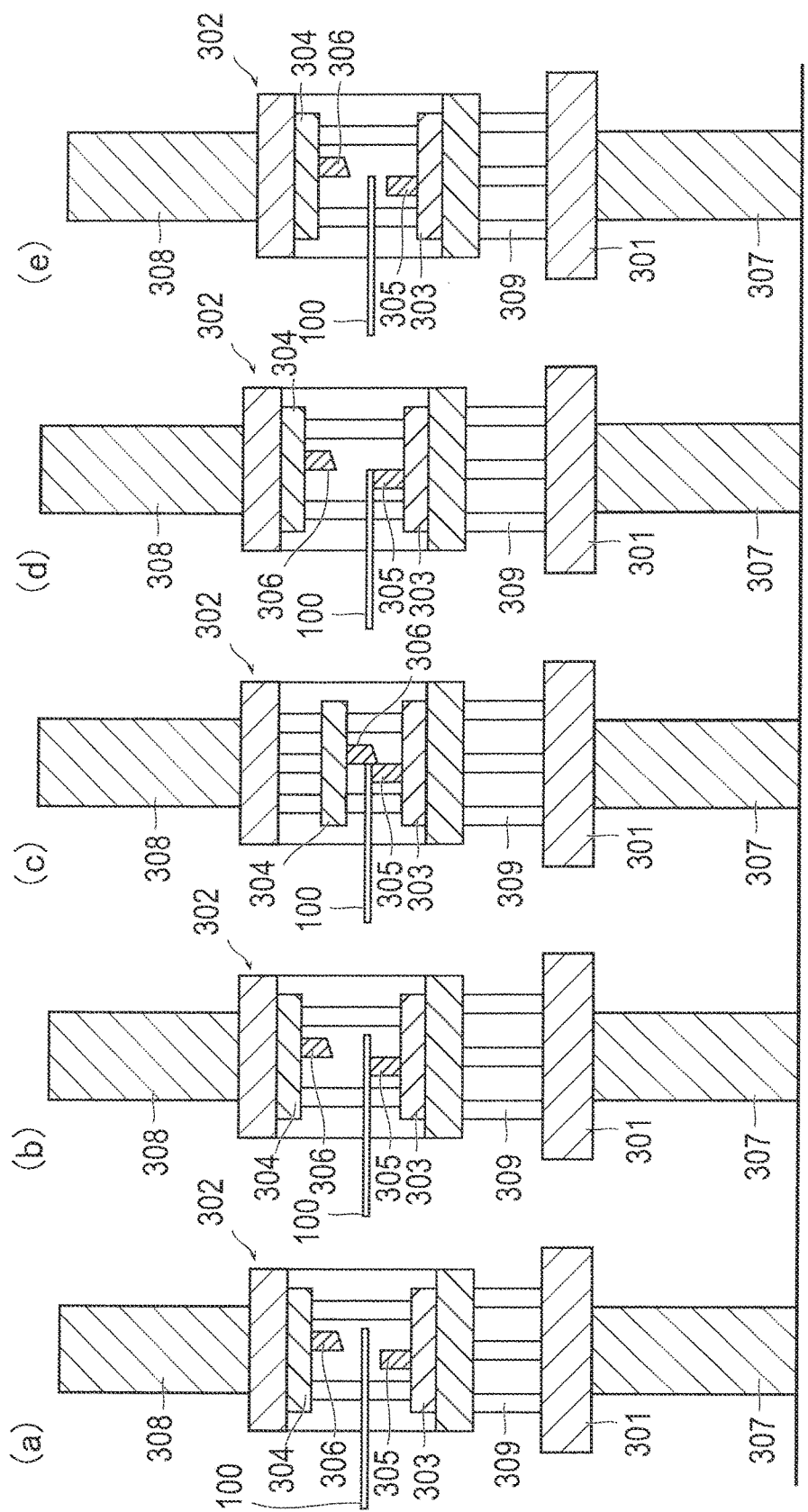
FIG. 7 is a set of explanatory views showing an operation of the front end die.

FIG. 7 is a set of explanatory views showing the operation of the front end die 3 and shows the same cross section as Part (b) of FIG. 6.

When the front end die 3 is in an open state to allow insertion of an object to be cut thereinto, the bottom die 305 is located lower than the conveying surface (supporting surface) of the first suction conveyor 5 (see FIG. 2). Part (a) of FIG. 7 shows the open state of the front end die 3. In this open state, the leading end portion of the strip-shaped electrode material 100 is inserted to the cutting position, more specifically, to the position at which the bottom die 305 and the top die 306 engage with each other.

Then, as shown in Part (b) of FIG. 7, the bottom die 305 is raised along with the die frame 302 to a position at which the bottom die 305 contacts the strip-shaped electrode material 100 (the position of the supporting surface). The raising operation of the die frame 302 is performed by means of the frame cylinder 307.

Then, as shown in Part (c) of FIG. 7, the top die 306 is lowered inside the die frame 302 by means of the top die cylinder 3011 to cut the strip-shaped electrode material 100.

Then, as shown in part (d) of FIG. 7, the top die 306 is raised by means of the top die cylinder 308 to set the top die 306 back to its initial position inside the die frame 302.

Then, as shown in Part (e) of FIG. 7, the bottom die 305 is lowered along with the die frame 302 by means of the frame cylinder 307 to set the bottom die 305 back to its initial position.

As described above, the front end die 3 prevents the strip-shaped electrode material 100 from rubbing against the bottom die 305 during conveyance of the strip-shaped electrode material 100 because the bottom die 305 is located lower than the conveying surface (supporting surface) of the first suction conveyor 5 in the open state. This also allows easy insertion of the front end of the strip-shaped electrode material 100 to the cutting position. Further, even if the front end of the strip-shaped electrode material 100 hangs down, a situation such as the front end is caught between the first suction conveyor 5 and the bottom die 305 is prevented because the bottom die 305 is disposed lower than the conveying surface. Also, once the front end of the strip-shaped electrode material 100 reaches the cutting position, the bottom die 305 is raised to lift up the front end hanging down, and therefore the front end can be cut at the proper position. Moreover, after the cutting, the front end die 3 is set back to the open state again, so that the bottom die 305 is located lower than the conveying surface, as shown in Part (e) of FIG. 7. Accordingly, when the electrode after the cutting is discharged, the active material surface of the electrode can be prevented from rubbing against the bottom die 305.

Further, when the electrode after the cutting is moved from the first suction conveyor 5 to the second suction conveyor 6, the active material surface of the electrode can as well be prevented from rubbing against the bottom die 305 because the bottom die 305 is lower than the conveying surface of the first suction conveyor 5.

In this embodiment, when the bottom die 305 is raised, it is raised along with the die frame 302. Thus, the die frame structure makes it possible to raise the bottom die 305 while maintaining the prescribed engagement positions of the bottom die 305 and the top die 306.

Note that although the cutting is performed by raising the bottom die 305 and then lowering the top die 306 in the above description, the timing to start lowering the top die 306 is not particularly limited. The timing to start the lowering should be changed as appropriate according to the stroke of the bottom die 305 and the stroke of the top die 306 to the conveying surface, for example. That is, the timing to start the lowering should be changed as appropriate according to the stroke required for the bottom die 305 to rise to the conveying surface (supporting surface) and the stroke required for the top die 306 to reach the strip-shaped electrode material 100 supported on the conveying surface (supporting surface). Specifically, in the case, for example, where the stroke of the bottom die 305 is longer than the stroke of the top die 306 to the conveying surface, the start of the lowering of the top die 306 is set after the start of the raising of the bottom die 305 so that the top die 306 can reach the conveying surface (supporting surface) when the bottom die 305 reaches the conveying surface (supporting surface). In contrast, in the case where the stroke of the bottom die 305 is shorter than the stroke of the top die 306 to the conveying surface, the start of the lowering of the top die 306 is set before the start of the raising of the bottom die 305 so that the top die 306 can reach the conveying surface (supporting surface) when the bottom die 305 reaches the conveying surface (supporting surface). Adjusting the timings to move the top die 306 and the bottom die 305 as described above can further shorten the takt time required for cutting. It is preferable to adjust the timings to move the top die 306 and the bottom die 305 on the basis of not only the strokes of the top die 306 and the bottom die 305 but also the different in moving speed and the like.

Note that a scrap portion resulting from the cutting of the strip-shaped electrode material 100 into an electrode shape with the front end die 3 simply falls down because the scrap portion is not in contact with either the first suction conveyor 5 or the second suction conveyor 6. In view of this, it is preferable to provide a slope or the like for taking out falling scraps at the downstream side of the die supporting table 301 of the front end die 3 in the conveying direction.

The rear end die 4 is disposed upstream of the first suction conveyor 5 in the conveying direction. The basic structure of the rear end die 4 may be the same as the front end die 3 described above, but the cutting profile of the die is different. Regarding the operation, first, the hand 2 is caused to retreat (move to the upstream side in the conveying direction), so that the grasping members 23 to 26 retreat from between a bottom die 41 and a top die 42 of the rear end die 4. Thereafter, the bottom die 41 of the rear end die 4 is raised along with its die frame and brought into contact with the strip-shaped electrode material 100. Then, the top die 42 is lowered to cut the rear end. Note that the rear end die 4 is given a similar configuration to the front end die 3 for the purpose of securing a clearance through which the grasping members 23 to 26 of the hand 2 can pass between the bottom die 41 and the top die 42 of the rear end die 4. As already described, in this embodiment, in conveyance of the strip-shaped electrode material 100, the strip-shaped electrode material 100 passes immediately above the conveying surface of the first suction conveyor 5 so as to shorten the time taken for the raising and lowering operations of the hand 2. For this reason, the grasping members 23 to 26 cannot pass between the bottom die 41 and the top die 42 of the rear end die 4 if the bottom die 41 is present on the same plane as the conveying surface of the first suction conveyor 5. To avoid this, the bottom die 41 is lowered to be located lower than the conveying surface of the first suction conveyor 5 while the grasping members 23 to 26 are passing between the bottom die 41 and the top die 42 of the rear end die 4.

Note that the bottom die 41 of the rear end die 4 may be on the same plane as the conveying surface in the case of raising the hand 2 to such a level that the grasping members 23 to 26 can pass above the bottom die 41. This is because, in conveyance of the strip-shaped electrode material 100, the hand 2 conveys the strip-shaped electrode material 100 through the air at a level higher than the conveying surface, and therefore the strip-shaped electrode material 100 thus conveyed does not rub on the bottom die 41.

The first suction conveyor 5 is disposed between the front end die 3 and the rear end die 4 (see FIGS. 1 and 2). The first suction conveyor 5 stops its suction operation and conveying operation (moving a belt) while the hand 2 is carrying and positioning the strip-shaped electrode material 100. The first suction conveyor 5 then starts the suction operation when (almost at the same time or with a slight delay) the hand 2 finishes carrying and positioning the strip-shaped electrode material 100, that is, when (almost at the same time or with a slight delay) the front end of the strip-shaped electrode material 100 reaches the cutting position. At this point, the first suction conveyor 5 does not yet perform the conveying operation. The first suction conveyor 5 stops the conveying operation, that is, the first suction conveyor 5 does not move its conveyor belt while attracting and holding the strip-shaped electrode material 100. As a result, the strip-shaped electrode material 100 carried and positioned by the hand 2 is positioned at the cutting position by the attracting force of the first suction conveyor 5. Thereafter, the first suction conveyor 5 continues the suction operation with the conveying operation being stopped, until the cutting operations of the front end die 3 and the rear end die 4 end. Then, once the front end die 3 and the rear end die 4 finish cutting the front end and the rear end of an electrode, the first suction conveyor 5 starts the conveying operation to discharge the cut electrode toward the downstream side in the conveying direction together with the second suction conveyor 6.

The conveying surface of suction conveyor 5 serves as a supporting surface which supports the strip-shaped electrode material 100 when it is cut. For this reason, the conveying surface is a flat surface. With the conveying surface of the first suction conveyor 5 being a flat surface, the attracted and supported strip-shaped electrode material 100 is set in a flat posture, which makes it possible to cut the strip-shaped electrode material 100 neatly.

The second suction conveyor 6 is disposed downstream of the front end die 3 in the conveying direction (see FIGS. 1 and 2). The conveying surface of the second suction conveyor 6 is disposed to be located lower than the conveying surface of the first suction conveyor 5. By the time when the cut electrode is pushed out by the first suction conveyor 5, the rigidity of the electrode in the conveying direction is already lost. For this reason, the front end of the electrode may possibly hang down when the electrode is pushed out by the first suction conveyor 5. With the conveying surface of the second suction conveyor 6 being located lower than the conveying surface of the first suction conveyor 5, the electrode can be securely put on the conveying surface of the second suction conveyor 6 even when the front end of the electrode hangs down.

Moreover, the bottom die 305 of the front end die 3 is disposed to be located lower than a moving trajectory which the electrode passes when moving from the first suction conveyor 5 to the second suction conveyor 6. The bottom die 305 is disposed preferably such that the conveying surface of the second suction conveyor 6 is located on the same horizontal plane as the bottom die 305 or slightly higher than the bottom die 305.

The first suction conveyor 5 is slightly higher than the second suction conveyor 6, and the bottom die 305 is present between the first suction conveyor 5 and the second suction conveyor 6. When the electrode is discharged from the first suction conveyor 5 to the second suction conveyor 6, the electrode is pushed out slightly downward. When this occurs, the electrode that is being discharged from the first suction conveyor 5 may possibly hit the bottom die 305 if the bottom die 305 is present higher than the moving trajectory of the electrode along which the electrode moves to the second suction conveyor 6. To avoid this, the bottom die 305 is given at a position outside the moving trajectory of the electrode discharged from the first suction conveyor 5 to the second suction conveyor 6.

Note that the suction operation and the conveying operation (moving the belt) of the second suction conveyor 6 may be performed constantly, or the suction operation and the conveying operation may be started when the front end of the electrode is cut.

Figure 8:
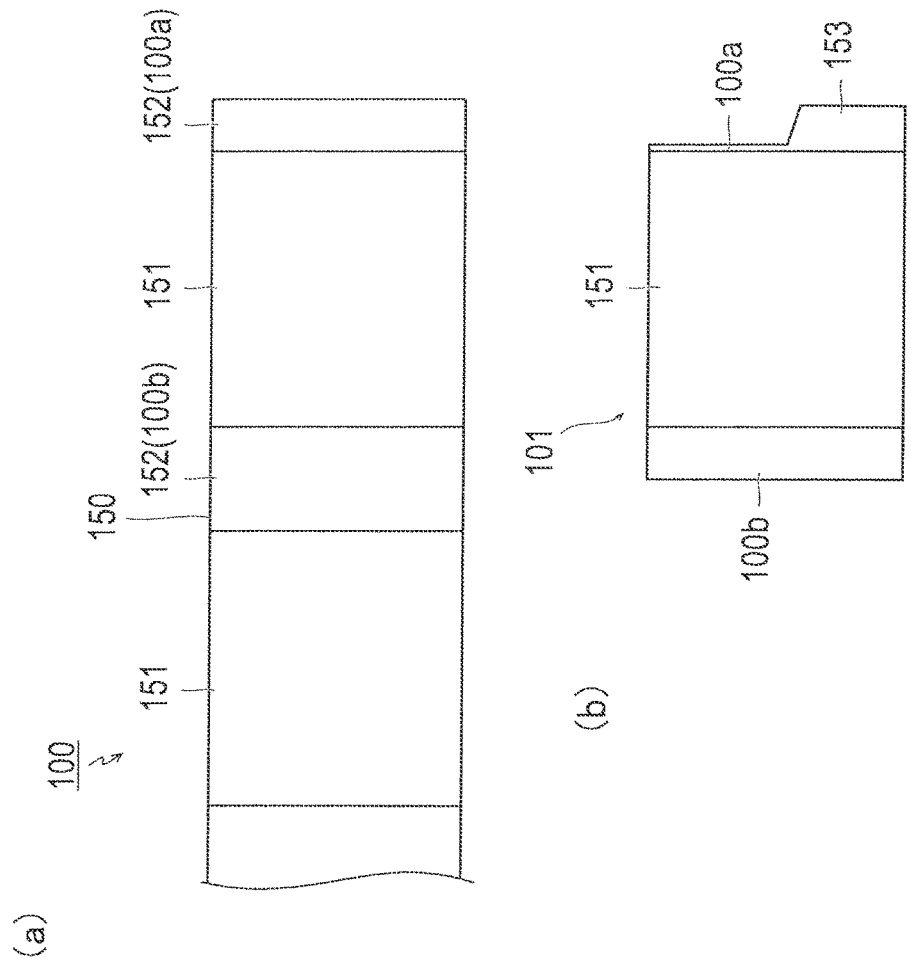
FIG. 8 is a set of views showing the shape of an electrode. Part (a) is a schematic plan view showing the strip-shaped electrode material before cutting. Part (b) is a schematic plan view showing the shape of a cut-out electrode.

Now, the shape of an electrode to be cut out by the electrode manufacturing apparatus will be described. FIG. 8 is a set of views showing the shape of an electrode. Part (a) is a schematic plan view showing the strip-shaped electrode material before cutting. Part (b) is a schematic plan view showing the shape of a cut-out electrode.

As shown in Part (a) of FIG. 8, the strip-shaped electrode material 100 has a metal foil as its base material 150, and both surfaces thereof are coated with an active material 151 at given intervals. The coating active material 151 is a positive active material in the case of a positive electrode, and is a negative active material in the case of a negative electrode. The active material 151 is a well-known active material, and therefore description thereof is omitted.

A region 152 of the strip-shaped electrode material 100 at its front end 100*a* which is not coated with the active material 151 and from which metal is exposed, is cut into a prescribed shape as shown in Part (b) of FIG. 8 and will be used as is as an electrode tab 153 of a battery. On the other hand, a rear end 100*b* is cut straightly. As a result, the strip-shaped electrode material 100 turns into the shape of an electrode 101.

For the metal foil as the material 150, aluminum, nickel, iron, stainless steel, titanium, copper, or the like is used, for example. Moreover, a clad material of nickel and aluminum, a clad material of copper and aluminum, a plating material of a combination of these metals, or the like is used in some cases. Further, instead of a metal foil, it is possible to employ a resin such as a conductive polymeric material or a non-conductive polymeric material with a conductive filler added thereto. Among these, a foil of a plain metal such as aluminum, stainless steel, or copper is frequently used in view of electronic conduction and battery operating potential. The metal material and the like to be used vary from one case to another depending upon whether they are for a positive electrode or a negative electrode. Moreover, the thickness of this base material 150 is about 1 to 100 μm, for example. Such a base material 150 will serve as a collector after being formed as a battery.

Meanwhile, in the case where the cut-out electrode is used as a rechargeable battery for an electric vehicle, the size of the electrode is about B5 to A4 in terms of paper size. For this reason, the widthwise size of the strip-shaped electrode material 100 is about the B5 to A4 size, but the length is several tens to several hundreds meters and thus the strip-shaped electrode material 100 is wound in a roll shape.

In this embodiment, the shape of the cut-out electrode 101 is such that the cut shape of its front end 100*a* is the shape of the electrode tub 153 as shown in Part (b) of FIG. 8 so that the cut portion can be used as is as an electrode tab. On the other hand, the rear end 100*b* is cut straightly. The shape of the cut-out electrode as described above is obtained by cutting according to the battery to be used, and is therefore not limited to the illustrated shape.

Note that the electrode is not limited to one with the same polarity formed on both surfaces. It is possible to form a bipolar electrode with a positive electrode on one surface and a negative electrode formed on the other surface.

The electrode cut out as described above is used in a stacked rechargeable battery, for example. As is well known, a stacked rechargeable battery has a configuration in which a positive electrode, a separator, and a negative electrode are stacked in this order.

Meanwhile, the strip-shaped electrode material 100 and the electrode 101 cut out therefrom are extremely thin. On the other hand, rechargeable batteries for electric vehicles and the like which are required to achieve high density and high energy are large in area. For this reason, in horizontal conveyance, it is difficult for the strip-shaped electrode material to maintain its shape by itself. This leads to the situation where a portion having moved off a conveying machine (e.g. a conveyor) or the like and thus lost support is likely to hang down.

Next, operations of the entire electrode manufacturing apparatus will be described.

First, the front end of the strip-shaped electrode material 100 grasped by the hand 2 is conveyed and positioned to the cutting position of the front end die 3. In this step, as already described, each part of the hand 2 passes by the lateral side of the first suction conveyor 5, and therefore the vertical movement of the hand 2 hardly takes time. Moreover, the strip-shaped electrode material 100 is conveyed through the air with its rigidity enhanced in the conveying direction. Accordingly, the front end can be conveyed to the cutting position without the strip-shaped electrode material 100 contacting and rubbing against other members. This state is the aforementioned state in FIGS. 1 and 2.

The suction operation of the first suction conveyor d (at this point, the first suction conveyor 5 does not yet perform its conveying operation) as soon as (almost at the same time or with a slight delay) the positioning by the hand 2 is done, i.e. as soon as (almost at the same time or with a slight delay) the front end of the strip-shaped electrode material 100 reaches the cutting position of the front end die 3. This completes the positioning of the strip-shaped electrode material 100 for cutting, and the strip-shaped electrode material 100 is held at that position. As the suction operation starts, the hand 2 is released and shifts to a retreating operation. Further, the bottom die 305 is raised along with the die frame 302 to bring the bottom die 305 into contact with the front end of the strip-shaped electrode material 100, at almost the same time as the above operations (the timing may be before the start of the suction operation as long as it is after the front end of the strip-shaped electrode material 100 reaches the cutting position of the front end die 3). In this step, the grasping members 23 to 26 of the hand 2 only come to a point before the front end die 3, and therefore the grasping members 23 to 26 of the hand 2 do not interfere with the front end die 3. For this reason, the raising operation of the die frame 302 can be started when the front end of the strip-shaped electrode material 100 reaches the cutting position of the front end die 3. Thus, the die operation can be performed before the retreating operation of the hand 2, and the takt time can be shortened accordingly.

As already described, the front end die 3 then cuts the front end into the predetermined shape. During the cutting operation of the front end, the hand 2 retreats and returns to its position before the grasping of the strip-shaped electrode material 100. Moreover, the front end die 3 after finishing the cutting operation returns to its initial position as well.

Figure 9:
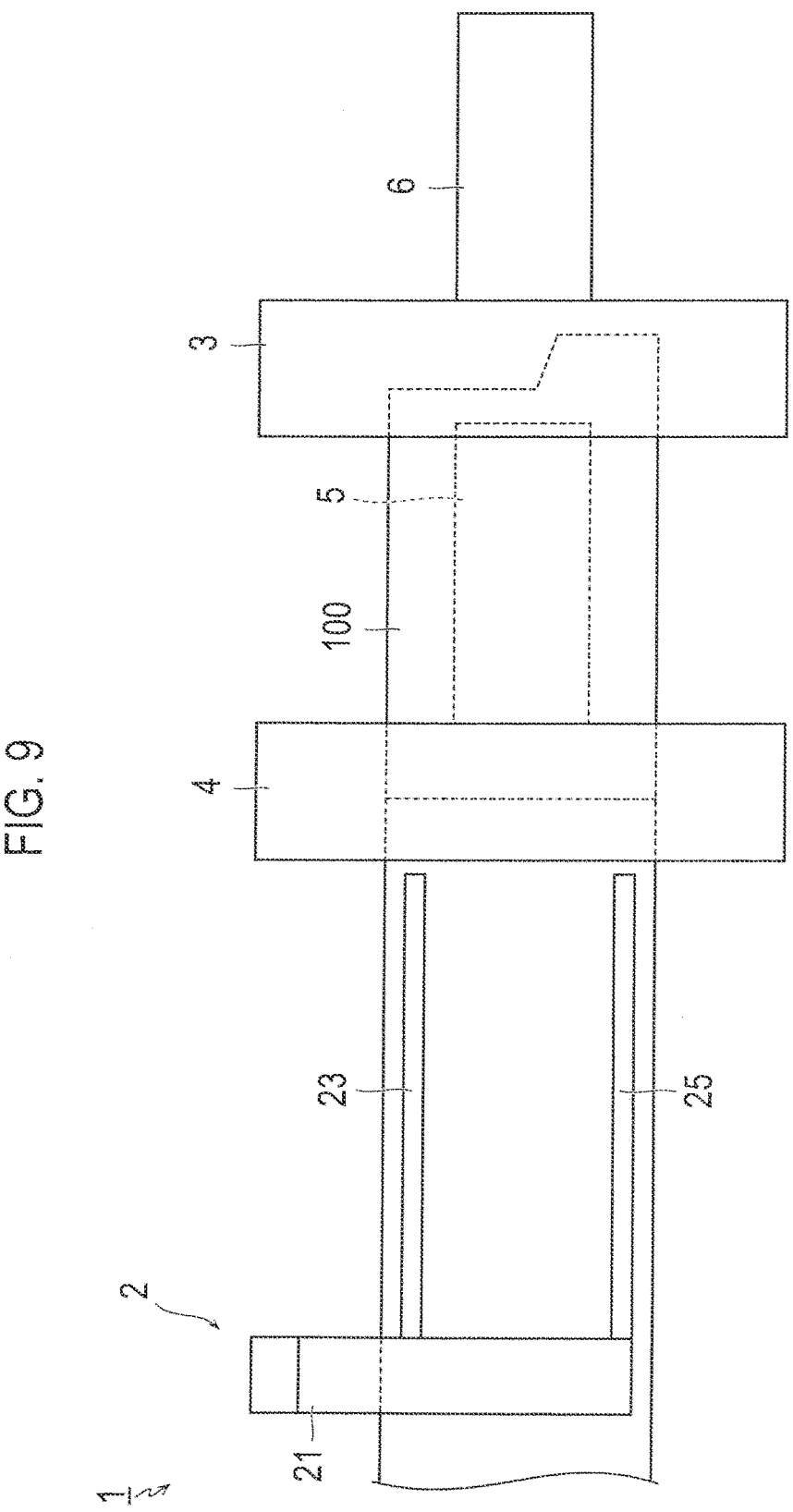
FIG. 9 is a plan view showing the retreat position of the hand.
Figure 10:
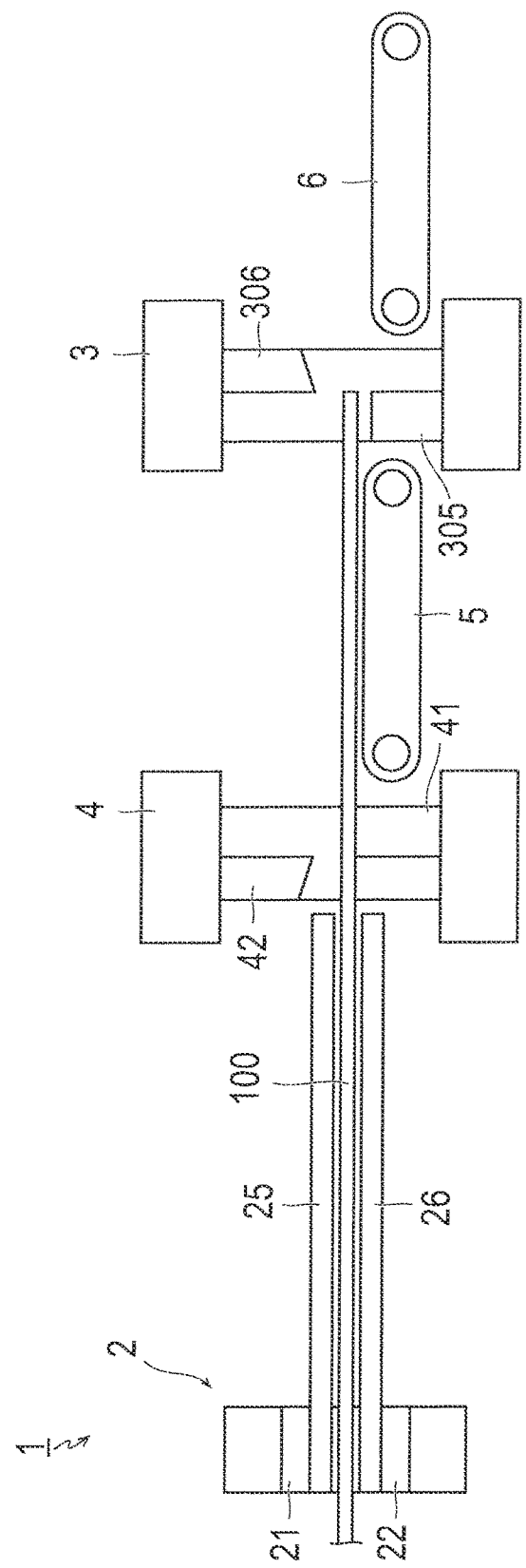
FIG. 10 is a side view showing the retreat position of the hand.

FIG. 9 is a plan view showing the retreat position of the hand, and FIG. 10 is a side of the same.

After the hand 2 retreats, the rear end die 4 cuts the rear end of the strip-shaped electrode material 100. When the cutting by the rear end die 4 ends, the first suction conveyor 5 starts its conveying operation, thereby pushing out the electrode 101 formed in the prescribed shape toward the second suction conveyor 6. The second suction conveyor 6 receives the electrode 101 and further moves it to the subsequent step. Accordingly, the electrode after the cutting does not rub against other members.

The embodiment described above brings about the following advantageous effects.

(1) In the electrode manufacturing apparatus 1, the first suction conveyor 5 is disposed between the pair of graspers constituting the hand 2, i.e. the first grasper (grasping members 23 and 24) and the second grasper (grasping members 25 and 26). In this way, each, part of the hand 2 can pass by the laterally outer side of the first suction conveyor 5 without interfering with the first suction conveyor 5. Thus, the hand 2 can move and convey the strip-shaped electrode material 100 above the first suction conveyor 5 (the hand 2 can move and convey the strip-shaped electrode material 100 in such a way that the strip-shaped electrode material 100 passes immediately above the first suction conveyor 5) by moving only slightly vertically (or without moving vertically). As a result, the time taken in the step involving vertical movement of the hand 2 can be reduced to a slight amount of time (or to zero), and thereby the time taken in the carrying-in step can be shortened. Accordingly, the takt time can be improved although the hand 2 and the first suction conveyor 5 are on the same side (at overlapping positions in the conveying direction).

Moreover, in the electrode manufacturing apparatus 1, the hand 2 carries the strip-shaped electrode material 100 to the cutting position of the front end die 3 through the air. In the through-air conveyance, the strip-shaped electrode material 100 is held at such a position as not to contact either the front end die 3 or the first suction conveyor 5. For this reason, the strip-shaped electrode material 100 does not rub against other members, or the die in particular. Accordingly, it is possible to prevent decrease in capacitance, decrease in life due to the decreased capacitance, and the like, all of which are attributable to reduction in the thickness of the active material resulting from the strip-shaped electrode material 100 rubbing on other members and thereby losing the active material coating the electrode.

(2) Moreover, the hand 2 grasps the strip-shaped electrode material 100 at such a position that each part of the hand 2 (grasping members 23 to 26 in particular) do not interfere with the front end die 3 when carrying the strip-shaped electrode material 100 to the cutting position of the front end die 3 (i.e. when the portion to be cut of the strip-shaped electrode material 100 reaches the cutting position of the front end die 3). Thus, the front end die 3 can be operated as soon as the front end of the strip-shaped electrode material 100 reaches the cutting position of the front end die 3. Accordingly, the die can be operated without waiting for the retreating operation of the hand 2, and the takt time can be shortened accordingly.

(3) Moreover, in the electrode manufacturing apparatus 1, when grasping the strip-shaped electrode material 100, the hand 2 grasps the strip-shaped electrode material 100 in such a way as to curve it in a direction crossing the conveying direction. In this way, the rigidity of the strip-shaped electrode material 100 in the conveying direction is enhanced. Accordingly, the front end of the strip-shaped electrode material 100 does not hang down, even though the hand 2 grasps only a rear portion of the strip-shaped electrode material 100 (a portion away from the leading end portion) to prevent the hand 2 from interfering with the front end die 3. Also, since this prevents interference between the hand 2 and the front end die 3, the die can be operated before the retreating operation of the hand 2.

(4) Further, in the electrode manufacturing apparatus 1, the hand 2 including the grasping member 23 and the grasping member 24 facing it, and the grasping member 25 and the grasping member 26 facing it, grasps the strip-shaped electrode material 100 therebetween. Accordingly, the vicinity of each end of the strip-shaped electrode material 100 in a direction perpendicular to the conveying direction can be easily grasped.

(5) Moreover, the front end die 3 is configured such that the bottom die 305 is located lower than the conveying surface (supporting surface) of the first suction conveyor 5 before the strip-shaped electrode material 100 is carried, and the bottom die 305 is raised to the supporting surface after the strip-shaped electrode material 100 is carried (when the strip-shaped electrode material 100 is inserted to the inside of the die). Accordingly, the front end of the strip-shaped electrode material 100 is easily inserted to the cutting position of the front end die 3 when the strip-shaped electrode material 100 is carried, and also the strip-shaped electrode material 100 does not rub against the front end die 3. Further, the bottom die 305 is located at the lower position, and the bottom die 305 is raised after the strip-shaped electrode material 100 is carried, so that even if the front end of the strip-shaped electrode material 100 hangs down, the hanging portion can be lifted up to set the strip-shaped electrode material 100 to the prescribed position, and then the cutting can be performed.

(6) Further, in the electrode manufacturing apparatus 1, the bottom die 305 is fixed to the die frame 302 whereas the top die 306 is held movably inside the die frame 302, and the bottom die 305 and the top die 306 are collectively raised along with the die frame 302 when the bottom die 305 is raised to the supporting surface. In this way, the bottom die 305 and the top die 306 can always maintain their positional relation with respect to each other by means of the die frame 302 and can therefore engage with each other securely. Moreover, since the bottom die 305 is fixed to the die frame 302, the engagement should be adjusted by adjusting the position of the top die 306 relative to the bottom die 305 as in the case of a normal press die.

(7) Moreover, after the cutting, the bottom die 305 returns to its initial position, i.e. to a position lower than the conveying surface (supporting surface) of the first suction conveyor 5. Accordingly, the electrode 101 does not contact and rub against the bottom die 305 when the electrode 101 is discharged after the cutting.

(8) Further, the electrode manufacturing apparatus 1 includes the rear end die 4 which is disposed upstream of the first suction conveyor 5 in the conveying direction and cuts the strip-shaped electrode material 100 at a position corresponding to the rear end of an electrode. Accordingly, the electrode manufacturing apparatus 1 can cut the electrode material into a shape in which its front end and rear end appear differently.

(9) Moreover, in the electrode manufacturing apparatus 1, the hand 2 positions the strip-shaped electrode material 100 to the cutting position. Then, the first suction conveyor 5 attracts and holds the strip-shaped electrode material 100 when the front end die 3 or the rear end die 4 cuts the strip-shaped electrode material 100. In this way, the strip-shaped electrode material 100 is fixed to the predetermined position by the attraction and thus prevented from being displaced during the cutting (during the die operation). Accordingly, the strip-shaped electrode material 100 can be securely cut into the prescribed shape.

(10) Further, the first suction conveyor 5 stops its conveying operation while attracting and holding the strip-shaped electrode material 100. Accordingly, the front end die 3 and the rear end die 4 can securely cut the front end and the rear end of the electrode 101 into the prescribed shapes.

(11) Moreover, the first suction conveyor 5 stops its conveying operation and its suction operation during the positioning by the hand 2 and performs the suction operation after the positioning. Accordingly, the strip-shaped electrode material 100 can be securely prevented from being attracted by and rubbed against the conveying surface 5a of the first suction conveyor 5 during the positioning operation of the hand 2.

(12) Further, the first suction conveyor 5 starts its suction operation immediately after the hand 2 finishes carrying and positioning the strip-shaped electrode material 100. Thus, the first suction conveyor 5 holds the strip-shaped electrode material 100 at almost the same time as when the hand 2 releases the strip-shaped electrode material 100. Accordingly, the strip-shaped electrode material 100 can be prevented from being displaced by the releasing operation of the hand 2.

(13) Moreover, the first suction conveyor 5 continues its suction operation with its conveying operation being stopped, until the cutting operations of the front end die 3 and the rear end die 4 end. Thus, the strip-shaped electrode material 100 is not displaced until the cutting operations of the front end die 3 and the rear end die 4 end. If the workpiece is simply placed at the prescribed position, the workpiece may possibly be displaced by vibrations and the like caused by the die operation, especially in the case of a workpiece of a thin foil shape. However, the electrode manufacturing apparatus 1 maintains the position of the workpiece by means of suction and can therefore prevent such displacement by vibrations and the like.

(14) Further, in the electrode manufacturing apparatus 1, the conveying surface of the second suction conveyor 6 is located lower than the conveying surface of the first suction conveyor 5. Accordingly, when the electrode 101 after the cutting is discharged, the electrode 101 can be securely passed from the first suction conveyor 5 to the second suction conveyor 6.

(15) Further, in the electrode manufacturing apparatus 1, after the rear end die 4 cuts the rear end of the electrode, the first suction conveyor 5 discharges the cut electrode 101 to the downstream side of the front end die 3 in the conveying direction together with the second suction conveyor 6. By utilizing the first suction conveyor 5 as a discharging device for the electrode 101 as described above, successive manufacturing of electrodes is possible.

The battery electrode manufactured as described above is preferable particularly as a positive electrode or a negative electrode for use in a rechargeable battery to be mounted on a vehicle as a motor driving power source. Here, examples of the vehicle include an automobile that drives its wheels by means of a motor, and other vehicles (e.g. trains). Examples of the above automobile include a fully electric automobile that uses no gasoline, hybrid automobiles such as a series-hybrid automobile and a parallel-hybrid automobile, and the like. Motor driving rechargeable batteries for use in these vehicles are particularly required to have high output characteristics and high energy, and therefore the areas of their electrodes are becoming larger. The sizes are, for example, about B5 to A4 as already described. Thus, the electrodes of the motor driving rechargeable batteries are extremely thin relative to their areas, and are therefore difficult to handle as compared to battery electrodes for mobile phones, personal computers, and the like that have a business card size or smaller. As already described, this embodiment is particularly suitable for manufacturing of these large-sized battery electrodes.

Although an embodiment of the present invention is described above, the embodiment is a mere illustrative example described for the purpose of facilitating understanding of the present invention, and the present invention is not limited to the embodiment. The technical scope of the present invention is not limited to the specific technical matters disclosed in the embodiment and the like, but encompasses various modifications, changes, alternative techniques, and the like which can be derived therefrom.

For example, although the front end and the rear end of the electrode have different shapes in the foregoing embodiment, they may have the same shape. In the case of cutting into the same shape, there may only be the front end die 3, and the rear end die 4 may be omitted. The case of using only the front end die 3 for the cutting into the electrode shape involves performing cutting with the front end die 3, carrying the strip-shaped electrode material 100 until its leading end portion projects the length of one electrode from the front end die 3 toward the downstream side in the conveying direction, and then performing the next cutting. In other words, the rear end side of the electrode shape is cut by the dies disposed at the position of the front end die 3. In this case, too, the hand 2 grasps the strip-shaped electrode material 100 in such a way as to prevent the strip-shaped electrode material 100 from interfering with the dies disposed at the position of the front end die 3 and also to impart rigidity to the strip-shaped electrode material 100 in the conveying direction, as in the case of the embodiment described above. In this way, the strip-shaped electrode material 100 can be carried to the cutting position without interfering with other members, and also the die operations can be started when the strip-shaped electrode material 100 reaches the cutting position.

Moreover, in the case of using only the front end die 3 for the cutting into the electrode shape as described above, the electrode is cut out at the downstream side of the front end die 3 in the conveying direction. For this reason, the cut-out electrode 101 does not need to be discharged by use of the first suction conveyor disposed upstream of the front end die 3 in the conveying direction. Accordingly, in this case, no first suction conveyor is needed. However, in this case, too, it is preferable that a suction device which supports the strip-shaped electrode material 100 at the time of cutting is provided before the front end die 3 and that the strip-shaped electrode material 100 carried by the hand 2 is attracted and supported by the suction device. Attracting and supporting the strip-shaped electrode material 100 before the front end die 3 secures neat cut of the strip-shaped electrode material 100. As the suction device, a suction pad is used, for example. The suction pad is disposed such that its sucking surface serves as a supporting surface. In this case, too, the sucking surface of the suction pad is a flat surface. Moreover, the suction pad starts its suction operation at the same time as when the strip-shaped electrode material 100 carried by the hand 2 reaches the cutting position and the hand 2 releases the strip-shaped electrode material 100. The suction device then stops the suction operation immediately before the hand 2 grasps the strip-shaped electrode material 100 again.

Moreover, the cutting device and the rear end cutting device are not limited to dies and may be lasers, for example. In the case of laser cutting, a pad member is disposed at a position corresponding to the bottom die of the front end die 3 in particular, the pad member is vertically movable, and a laser beam is applied from above the pad member to perform cutting. Even if the front end portion of the strip-shaped electrode material 100 hangs down, the use of the vertically movable pad member makes it possible to lift up and position the front end portion to the prescribed position. Moreover, since laser cutting is performed in that state, it is possible to prevent the occurrence of dimensional errors during the cutting.

The front end die 3 is configured such that the bottom die 305 and the top die 306 are provided integrally to the die frame and that only the top die 306 is moved in the die operation. However, the top die and the bottom die may be provided independently if the top die and the bottom die can securely engage with each other at the prescribed positions during cutting. Specifically, the bottom die 305 may be raised independently when the front end of the strip-shaped electrode material 100 reaches the cutting position, and the top die 306 may then be lowered for cutting. The same applies to the rear end die 4.

Moreover, the advancing and retreating operations of the hand 2 are performed only along the conveying direction. Instead, the operation direction and the like in the retreating operation can be set to any suitable ones by, for example, causing the hand 2 to retreat first to a lateral side after releasing the strip-shaped electrode material 100, and then return to the initial position.

This application is based upon and claims the benefit of priority from Japanese Patent Application No. 2011-085724 filed on Apr. 7, 2011, Japanese Patent Application No. 2011-085727 filed on Apr. 7, 2011, Japanese Patent Application No. 2011-085729 filed on Apr. 7, 2011, and Japanese Patent Application No. 2012-067798 filed on Mar. 23, 2012, the entire contents of which are incorporated herein by reference.

INDUSTRIAL APPLICABILITY

According to the present invention, an electrode material is conveyed through the air to the cutting position of the cutting device, so that the electrode material does not rub against other members. Further, the supporting device is provided between the pair of graspers of the carrying-in device, so that the graspers and the supporting device do not interfere with each other. Thus, the electrode material can be carried to the cutting position with almost no vertical movement of the carrying-in device. Accordingly, the time taken in the carrying-in step can be shortened.

REFERENCE SIGNS LIST

1 electrode manufacturing apparatus
2 hand
3 front end die
4 rear end die
5 first suction conveyor
5a conveying surface (supporting surface)
6 second suction conveyor
20 grasping mechanism part
21, 22 main arm
23 to 26 grasping member (the grasping members 23 and 24 are a first grasper; the grasping members 25 and 26 are a second grasper; the first and second graspers form a pair of graspers)
100 strip-shaped electrode material
101 electrode
150 base material
151 active material
152 region
153 electrode tab
301 die supporting table
302 die frame
303 bottom die base
304 top die base
305 bottom die
306 top die
307 frame cylinder
308 top die cylinder
309 frame guide
310 top die guide

The invention claimed is:

1. A battery electrode manufacturing apparatus, comprising:
  a cutting device which cuts an electrode material of a strip foil shape into an electrode shape;
  a carrying-in device which grasps the electrode material and conveys the electrode material to a cutting position of the cutting device; and
  a supporting device which is disposed upstream of the cutting device in a conveying direction of the electrode material and has a supporting surface for supporting the electrode material when the cutting device cuts the electrode material, wherein
  the carrying-in device includes a pair of graspers,
  the supporting device is located between the pair of graspers at least when the electrode material is cut, and the carrying-in device carries the electrode material to the cutting position, at a position where the electrode material does not contact the cutting device or the supporting device.

2. The battery electrode manufacturing apparatus according to claim 1, wherein the pair of graspers grasp the electrode material at such positions as not to interfere with the cutting device when the carrying-in device carries the electrode material to the cutting position.

3. The battery electrode manufacturing apparatus according to claim 1, wherein the pair of graspers hold the electrode material in such a way as to curve the electrode material in a direction crossing the conveying direction.

4. The battery electrode manufacturing apparatus according to claim 1, wherein the pair of graspers are a hand which clamps the electrode material.

5. The battery electrode manufacturing apparatus according to claim 1, wherein
the cutting device is a die including a bottom die which is vertically movable and a top die which engages with the bottom die to cut the electrode material, and
the die is configured such that the bottom die is located lower than the supporting surface before the electrode material is carried, and the bottom die is raised to the supporting surface and the top die is then lowered to cut electrode material after the electrode material is carried.

6. The battery electrode manufacturing apparatus according to claim 5, wherein
the die includes a die frame and a raising-lowering device which vertically moves the die frame, and
the bottom die is fixed to the die frame whereas the top die is held vertically movably inside the die frame.

7. The battery electrode manufacturing apparatus according to claim 5, wherein the bottom die is lowered to an initial position thereof after the electrode material is cut.

8. The battery electrode manufacturing apparatus according to claim 1, further comprising a rear end cutting device which is disposed upstream of the supporting device in the conveying direction and cuts the electrode material at a position corresponding to a rear end of an electrode.

9. The battery electrode manufacturing apparatus according to claim 1, wherein
the carrying-in device positions the conveyed electrode material to the cutting position, and
the supporting device is a first suction conveyor which attracts and holds the positioned electrode material when the cutting device cuts the electrode material.

10. The battery electrode manufacturing apparatus according to claim 9, wherein the first suction conveyor stops a conveying operation thereof, while attracting and holding the electrode material.

11. The battery electrode manufacturing apparatus according to claim 9, wherein the first suction conveyor stops a conveying operation thereof and a suction operation thereof during the positioning by the carrying-in device, arid performs the suction operation after the positioning.

12. The battery electrode manufacturing apparatus according to claim 9, wherein the first suction conveyor starts a suction operation thereof immediately after the positioning by the carrying-in device.

13. The battery electrode manufacturing apparatus according to claim 9, wherein the first suction conveyor continues a suction operation thereof until the cutting of the electrode material by the cutting device ends.

14. The battery electrode manufacturing apparatus according to claim 9, further comprising a second suction conveyor located downstream of the cutting device in the conveying direction, wherein a conveying surface of the second suction conveyor is located lower than a conveying surface of the first suction conveyor.

15. The battery electrode manufacturing apparatus according to claim 8, wherein
the supporting device is a first suction conveyor,
the supporting surface is a conveying surface of the first suction conveyor,
the battery electrode manufacturing apparatus further comprises a second suction conveyor located downstream of the cutting device in the conveying direction,
a conveying surface of the second suction conveyor is located lower than the conveying surface of the first suction conveyor,
the first suction conveyor performs a suction operation thereof to attract and support the electrode material with a conveying operation thereof being stopped, when the carrying-in device carries the electrode material to the cutting position, and
after the rear end cutting device cuts the rear end of an electrode, the first suction conveyor discharges the cut electrode toward a downstream side of the cutting device in the conveying direction together with the second suction conveyor.

16. A battery electrode manufacturing method, comprising:
providing a battery electrode manufacturing apparatus including
a cutting device which cuts an electrode material of a strip foil shape into an electrode shape;
a carrying-in device which grasps the electrode material and conveys the electrode material to a cutting position of the cutting device by means of a pair of graspers; and
a supporting device which is disposed between the pair of graspers at least when the electrode material is cut by the cutting device, is disposed upstream of the cutting device in a conveying direction of the electrode material, and has a supporting surface for supporting the electrode material when the cutting device cuts the electrode material;
holding and carrying the electrode material to the cutting position by means of the carrying-in device, the electrode material being held at such a position as not to contact the cutting device or the supporting device; and
cutting the carried electrode material into the electrode shape by means of the cutting device while supporting the electrode material on the supporting surface.

17. The battery electrode manufacturing method according to claim 16, further comprising:
grasping, by the pair of graspers, the electrode material at such positions that the pair of graspers and the cutting device do not interfere with each other when the electrode material is carried to the cutting position by the carrying-in device.

18. The battery electrode manufacturing method according to claim 16, further comprising:
holding, by the pair of graspers, the electrode material in such a way as to curve in a direction crossing the conveying direction during the carrying by the carrying-in device.

19. The battery electrode manufacturing method according to claim 16, wherein
the cutting device is a die including a bottom die which is vertically movable and a top die which engages with the bottom die to cut the electrode material, and the bottom die is located lower than the supporting surface before the electrode material is carried, and the bottom die is raised to the supporting surface and the top die is then lowered to cut the electrode material after the electrode material is carried.

20. The battery electrode manufacturing method according to claim 19, wherein
the bottom die and the top die are provided to a die frame to which the bottom die is fixed and inside which the top die is held vertically movably, and
the bottom die and the top die are collectively raised along with the die frame when the bottom die is raised to the supporting surface.

21. The battery electrode manufacturing method according to claim 19, further comprising:
lowering the bottom die to an initial position thereof after the electrode material is cut.

22. The battery electrode manufacturing method according to claim 16, wherein
the battery electrode manufacturing apparatus further includes a rear end cutting device which is disposed upstream of the supporting device in the conveying direction and cuts the electrode material at a position corresponding to a rear end of an electrode, and
the battery electrode manufacturing method further comprises cutting, by the rear end cutting device at the position corresponding to the rear end of an electrode, the electrode material carried by the carrying-in device.

23. The battery electrode manufacturing method according to claim 16, further comprising:
positioning the electrode material to the cutting position by the carrying-in device, and
attracting and holding the positioned electrode material by a first suction conveyor when the cutting device cuts the electrode material.

24. The battery electrode manufacturing method according to claim 23, further comprising:
not performing a conveying operation of the first suction conveyor while the electrode material is attracted and held by the first suction conveyor.

25. The battery electrode manufacturing method according to claim 23, further comprising:
stopping a conveying operation and a suction operation of the first suction conveyor during the positioning by the carrying-in device, and
performing the suction operation of the first suction conveyor after the positioning.

26. The battery electrode manufacturing method according to claim 23, further comprising:
starting a suction operation of the first suction conveyor immediately after the positioning by the carrying-in device.

27. The battery electrode manufacturing method according to claim 23, further comprising:
continuing a suction operation of the first suction conveyor until the cutting of the electrode material by the cutting device ends. conveyor.

28. The battery electrode manufacturing method according to claim 23, wherein
the battery electrode manufacturing apparatus further includes a second suction conveyor located downstream of the cutting device in the conveying direction, and
a conveying surface of the second suction conveyor is located lower than a conveying surface of the first suction conveyor.

29. The battery electrode manufacturing method according to claim 22, wherein
the supporting device is a first suction conveyor,
the supporting surface is a conveying surface of the first suction conveyor,
the battery electrode manufacturing apparatus further includes a second suction conveyor located downstream of the cutting device in the conveying direction,
a conveying surface of the second suction conveyor is located lower than the conveying surface of the first suction conveyor,
the battery electrode manufacturing method further comprises:
performing a suction operation of the first suction conveyor to attract and support the electrode material with a conveying operation thereof being stopped, when the carrying-in device carries the electrode material to the cutting position, and
discharging, after the rear end of an electrode is cut by the rear end cutting device, the cut electrode by the first suction conveyor and the second suction conveyor toward a downstream side of the cutting device in the conveying direction.

* * * * *